No. 712,179. Patented Oct. 28, 1902.
R. M. CONNABLE.
TIRE FASTENER.
(Application filed Aug. 9, 1902.)
(No Model.)

Witnesses.
H. J. Meyer Jr.
Frederick S. Stitt.

Inventor.
Ralph M. Connable
By Mann & Co.
Attorneys.

UNITED STATES PATENT OFFICE.

RALPH M. CONNABLE, OF BALTIMORE, MARYLAND.

TIRE-FASTENER.

SPECIFICATION forming part of Letters Patent No. 712,179, dated October 28, 1902.

Application filed August 9, 1902. Serial No. 119,019. (No model.)

*To all whom it may concern:*

Be it known that I, RALPH M. CONNABLE, a citizen of the United States, residing at Baltimore, State of Maryland, have invented certain new and useful Improvements in Tire-Fasteners, of which the following is a specification.

This invention relates to elastic vehicle-tires of that class in which the tire is seated in a channel-plate secured to the felly of the vehicle-wheel and is secured in said channel-plate by tie-wires or similar retaining means.

One object of the invention is to provide a tire of this character with one or more fasteners, which will press it outwardly against its retaining means; and another object is to provide the fasteners with means to take hold of the tire, so as to prevent it from "creeping."

The invention consists of certain constructions, arrangements, and combinations of parts, hereinafter fully described and claimed, reference being had to the accompanying drawings, in which—

Figure 1:
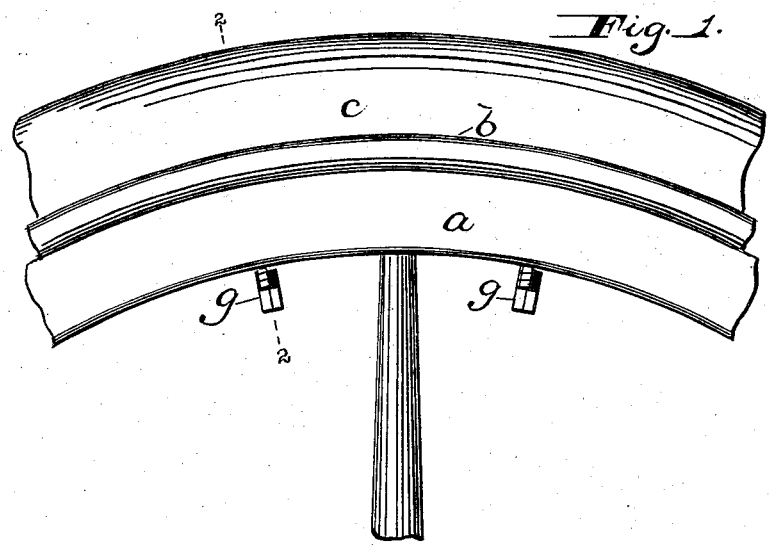
Figure 2:
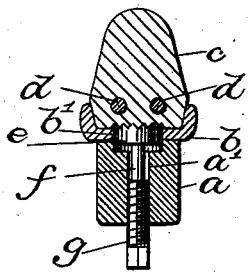
Figure 3:
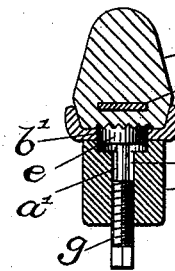
Figure 4:
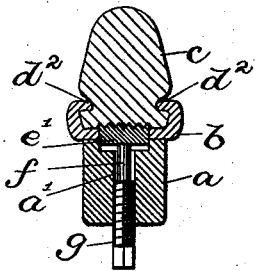
Figure 5:
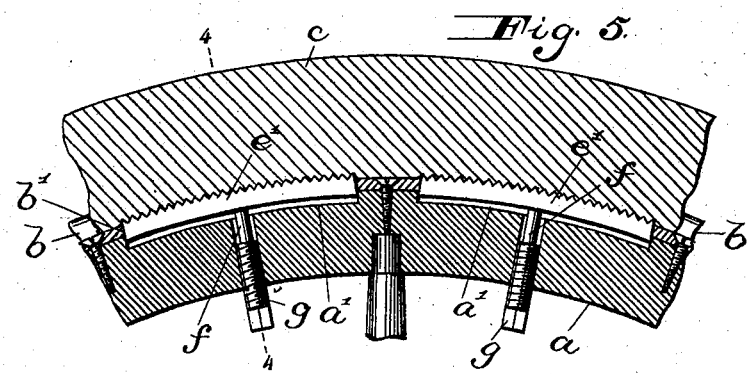
Figure 6:
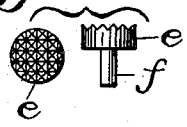

Figure 1 is a side view of a portion of a vehicle-wheel provided with the improved tire-fasteners of my invention. Fig. 2 is a transverse section thereof, taken approximately on the line 2 2 of Fig. 1. Fig. 3 is a similar view illustrating a slight modification. Fig. 4 is a transverse section taken approximately on the line 4 4 of Fig. 5 and illustrating another modification. Fig. 5 is a longitudinal sectional view of the modification illustrated in Fig. 4. Fig. 6 illustrates one form of bur in detail.

Referring to the drawings, the letter $a$ designates the felly of a vehicle-wheel, $b$ the channel-plate, secured in any suitable manner to the felly and adapted to receive the elastic tire, and $c$ designates the elastic tire seated in said channel-plate. In tires of this class the rubber or rubber-composition portion of the tire is retained on the channel-plate either by tie-wires $d$, embedded therein, as illustrated in Fig. 2, or by a band $d'$ instead of the tie-wires, as illustrated in Fig. 3, or by the inwardly-turned side edges $d^2$ of the channel-plate itself, as illustrated in Fig. 4. In connection with these retaining means my invention comprises one or more devices arranged to compress the tire outwardly against said means, and in the present instance said device comprises a bur consisting of a head $e$, having a roughened or serrated face, and a shank $f$. The said bur is seated in a socket $b'$ in the channel-plate, with its shank extending into an aperture $a'$ in the felly, and working in said aperture against the lower end of said shank is an adjusting device in the form of a threaded bolt $g$, so that as said bolt is screwed in the aperture it will move the bur outwardly and cause it to press the tire outwardly against its retaining means, while at the same time the roughened or serrated face of the bur takes hold of the tire and prevents the latter from creeping.

In the modifications illustrated in Figs. 4 and 5 the heads $e'$ of the said burs are elongated, so as to obtain an increased bearing-surface against the tire.

It is to be understood that any desired number of burs, with their adjusting-bolts, may be used and at any desired intervals around the circumference of the wheel.

Having thus fully described my invention, what I claim, and desire to secure by Letters Patent, is—

1. The combination with a vehicle-wheel having an elastic tire and retaining means for the tire, of one or more burs adapted to press said tire outwardly against said retaining means and provided with a roughened face in contact with the tire, as and for the purpose set forth.

2. The combination with a vehicle-wheel having an elastic tire and retaining means for the tire, of means for pressing said tire outwardly against said retaining means, including one or more threaded adjusting-bolts working through the felly of the wheel to move said pressing means outwardly against the tire, as and for the purpose set forth.

3. In a vehicle-wheel, the combination of the felly provided with one or more apertures extending therethrough; a channel-plate secured to the felly and provided with one or more sockets registering with said apertures; an elastic tire seated in said channel-plate and provided with retaining means securing it to said channel-plate; one or more burs seated in said sockets and provided with shanks extending into the apertures in the felly; and adjusting-bolts working in said apertures and adapted to press said burs outwardly into engagement with the tire, as and for the purpose set forth.

4. In a vehicle-wheel, the combination of the felly provided with one or more apertures extending therethrough; a channel-plate secured to the felly and provided with one or more sockets registering with said apertures; an elastic tire seated in said channel-plate and provided with retaining means securing it to said plate; one or more burs each consisting of a head with a roughened face seated in one of said sockets and a shank extending into a corresponding aperture; and adjusting-bolts working in said apertures against the ends of said shanks whereby to move said burs outwardly, as and for the purpose set forth.

In testimony whereof I affix my signature in the presence of two witnesses.

RALPH M. CONNABLE.

Witnesses:
PHILIP S. EDWARDS,
FREDERICK S. STITT.